United States Patent [19]

Smith et al.

[11] Patent Number: 4,853,571

[45] Date of Patent: Aug. 1, 1989

[54] INTERMEDIATE BEARING DRIVES FOR CLOTHES WASHING MACHINES

[75] Inventors: Dennis E. Smith; John J. A. Williams; Gerald D. Duncan; Graeme D. Thomas; John G. Borrows; Frank W. Shacklock, all of Auckland, New Zealand

[73] Assignee: Fisher & Paykel Limited, Auckland, New Zealand

[21] Appl. No.: 153,935

[22] Filed: Feb. 9, 1988

Related U.S. Application Data

[62] Division of Ser. No. 22,894, Mar. 6, 1987, Pat. No. 4,741,183.

[30] Foreign Application Priority Data

Mar. 6, 1986 [NZ] New Zealand ............... 215,389
Sep. 18, 1986 [NZ] New Zealand ............... 217,623
Nov. 21, 1986 [NZ] New Zealand ............... 218,356

[51] Int. Cl.$^4$ ............... H02K 5/16; H02K 7/08; F04B 17/00
[52] U.S. Cl. ............... 310/90; 68/12 R; 310/216; 417/423.12
[58] Field of Search ............... 68/12, 23; 310/42, 43, 310/67 R, 89, 153, 156, 214, 215, 216, 261, 269

[56] References Cited

U.S. PATENT DOCUMENTS

| 266,576 | 1/1954 | Thiele | 68/23 |
|---|---|---|---|
| 2,232,812 | 2/1941 | Studer | 310/215 |
| 2,702,093 | 2/1955 | Sherrill | 417/423.13 |
| 2,709,965 | 6/1955 | Litzenberg | 417/423.12 |
| 3,324,690 | 6/1967 | Button | 68/23 |
| 3,339,097 | 8/1967 | Dunn | 310/269 |
| 3,882,336 | 5/1975 | Boyd et al. | 310/216 |
| 4,528,485 | 7/1985 | Boyd, Jr. | 318/138 |
| 4,626,178 | 12/1986 | Terumoto | 310/89 |
| 4,672,250 | 6/1987 | Seitz | 310/90 |
| 4,712,035 | 12/1987 | Forbes et al. | 310/269 |

FOREIGN PATENT DOCUMENTS

1340648 1/1963 France .
2183932 6/1987 United Kingdom .

*Primary Examiner*—Patrick R. Salce
*Assistant Examiner*—D. L. Rebsch
*Attorney, Agent, or Firm*—Holman & Stern

[57] ABSTRACT

An electric motor, a drive and a clothes washing machine including the motor and drive, the motor having a stator held outboard of a frame carrying bearings in which a shaft rotates, the shaft carrying the rotor outboard of the stator, the rotor having permanent magnets on an inner face thereof. The shaft carries an agitator and a spin tub of the clothes washing machine, and interconnecting members between a part rotatable with the agitator and a part rotatable with the spin tub are movable axially on the shaft relative to each other by a buoyancy system which is operated by the absence or presence of water in a container of the clothes washing machine to connect the spin tub and the agitator, to be driven by the shaft continuously in one direction for spinning clothes when water is at a low level in or absent from the container, and to disconnect the spin tub from the shaft, leaving the agitator still connected to the shaft when sufficient water is in the container so that rotation of the shaft backwards and forwards by the motor washes clothes in the spin tub by backwards and forwards movement of the agitator.

1 Claim, 6 Drawing Sheets

INTERMEDIATE BEARING DRIVES FOR CLOTHES WASHING MACHINES

This is a divisional of application Ser. No. 022,894 filed Mar. 6, 1987, now U.S. Pat. No. 4,741,183.

BACKGROUND AND SUMMARY OF THE INVENTION

This invention relates to drives for clothes washing machines of the type having a cabinet in which an agitator is mounted on a vertical axis and is oscillated back and forth within a perforated spin tub which in turn is mounted within a water tight container, the spin tub and the agitator rotating continuously in one direction to give a spin action, said cabinet containing an electric motor and driving means for the agitator and spin tub and/or clothes washing machines incorporating such drives.

It is an object of the present invention to provide a drive for a clothes washing machine of the type described and/or a clothes washing machine incorporating such a drive which will at least provide the public with a useful choice.

Accordingly, in one aspect the invention consists in a drive for a clothes washing machine of the type having a cabinet in which an agitator is mounted on a vertical shaft so as to rotate therewith and is oscillated back and forth within a coaxially mounted perforated spin tub, the spin tub and the agitator rotating continuously in one direction to give a spin action, and the perforated spin tub and agitator in turn being mounted within a water tight container, said cabinet containing an electric motor and driving means to oscillate said agitator back and forth or rotate said spin tub continuously in one direction, and is characterised in that at least one part of said spin tub and one part rotatable with said agitator are axially movable relative to each other; in that each said one part has a part of an interconnecting means associated therewith; and in that interconnection actuating means are provided operable in a washing sequence to actuate said parts of said interconnecting means by relative axial movement of said at least one part rotatable with said agitator and said at least one part of said spin tub to connect said agitator to said spin tub when spin action is required and to actuate said parts of said interconnecting means to separate by opposite relative axial movement to permit said agitation of said agitator without material relative movement of said spin tub during a washing phase in said sequence.

In a further aspect the invention consists in a drive system comprising an electric motor having a stator carrying energizable windings on poles thereof, a shaft carrying said rotor and being rotatable in frames forming part of said electric motor, said frames also mounting said stator of said motor, a clothes washing agitator, a perforated spin tub in a washing container in turn mounted in a cabinet, with said motor, said clothes washing agitator and said spin tub being mounted co-axially on said shaft and rotatable thereon in a mode selected from an agitating mode in which said rotor, said shaft and agitator are oscillated backwards and forwards over an arc of movement and said spinning tub remains substantially stationary and a spinning mode in which said rotor, said spin tub and said agitator are rotated continuously in one direction. At least one part of said spin tub and one part rotatable with the agitator are axially movable relative to each other, each said one part having a part of an interconnecting means associated therewith, and interconnecting actuating means are provided operable in a washing sequence to actuate said parts of said interconnecting means by relative axial movement of said at least one part of said agitator and said at least one part of said spin tub to connect said agitator to said parts of said interconnecting means to separate by opposite relative axial movement to permit said agitation of said agitator without material relative movement of said spin tub during a washing phase in said sequence.

In a still further aspect the invention consists in a drive for a clothes washing machine of the type having a cabinet in which an agitator is mounted on a vertical shaft so as to rotate therewith and is oscillated back and forth within a perforated spin tub, the spin tub and the agitator rotating continuously in one direction to give a spin action and the perforated spin tub and agitator in turn being mounted within a water tight container, said cabinet containing an electric motor and driving means to oscillate said agitator back and forth or rotate said spin tub continuously in one direction, characterized in that said drive includes interconnecting means provided between said driving means and said spin tub, said interconnecting means including actuating means actuable by the presence or absence of a substantially predetermined quantity of water in said container so that when at least said predetermined amount of water is present in said container said interconnecting means are disconnected between said driving means and said perforated spin tub, and when water is substantially absent from said container said interconnecting means connect said driving means to said perforated spin tub so that said perforated tub will rotate with said driving means.

In a still further aspect the invention consists in a drive system for a clothes washing machine of the type having a cabinet in which an agitator is mounted on a vertical shaft so as to rotate therewith and is oscillated back and forth by an electric motor within a coaxially mounted perforated spin tub, the spin tub and the agitator being rotated continuously in one direction by said electric motor to give a spin action, and the perforated spin tub and agitator in turn being mounted within a water tight container, said cabinet containing an electric motor, said drive selectively oscillating said agitator back and forth and rotating said spin tub and agitator continuously in one direction, said drive including at least one part of said spin tub and one part rotatable with said agitator which are axially movable relative to each other, each said one part having a part of an interconnecting means associated therewith; and interconnection actuating means are provided operable in a washing sequence to actuate said parts of said interconnecting means by relative axial movement of said at least one part rotatable with said agitator and said at least one part of said spin tub to connect said agitator to said spin tub when spin action is required and to actuate said parts of said interconnecting means to separate by opposite relative axial movement to permit said agitation of said agitator without material relative movement of said spin tub during a washing phase in said sequence.

In a still further aspect the invention consists in an electric motor comprising a stator carrying energizable windings on poles thereof, a rotor, a motor frame, said frame having bearing mountings in a central disposition and having coacting locating means near outer edges thereof arranged to hold said frame with said bearing mountings separated and axially aligned, said frame having stator locating means arranged to hold the outer cylindrical surface of a stator concentric with said bearing mounting of said frame, a pair of bearings mounted in said bearing mountings, a shaft rotatably mounted in said bearings and carrying said rotor, said rotor comprising a backing ring of a magnetic material, a series of permanent magnets spaced apart on an inner surface of said backing ring and rotatable exteriorly of said stator windings, a hub mounted on said shaft, and a backing ring support holding inner faces of said permanent magnets concentric with said shaft.

In a still further aspect the invention consist in a clothes washing machine comprising a cabinet, a container for wash water suspended in said cabinet, an electric motor mounted below said container, an agitator within said container, a drive shaft between said electric motor and said agitator so that said electric motor directly drives said agitator, a spin tub within said container and within which said agitator is mounted, said spin tub being rotatably mounted on said drive shaft, sealing means between said drive shaft and said container and interconnecting means having two positions in one of which positions said interconnecting means connects said spin tub to said agitator so as to rotate therewith and in which other position said spin tub is disconnected from said agitator, an electric supply means arranged to drive said agitator in a forward and reverse motion to give agitation to clothes placed within said spin tub in one mode of operation when said spin tub is disconnected from said agitator, and arranged to rotate said spin tub and said agitator continuously in one direction when the spin tub and the agitator are interconnected by said interconnecting means.

In a still further aspect the invention consists in a clothes washing machine comprising a cabinet, a container for water suspended in said cabinet, an electric motor mounted below said container, an agitator within said container, a drive shaft between said electric motor and said agitator so that said electric motor directly drives said agitator, a spin tub within said container and within which said agitator is mounted, said spin tub being rotatably mounted on said drive shaft, sealing means between said drive shaft and said container, and interconnecting means having two positions, in one of which positions said connecting means connects said spin tub to said agitator so as to rotate therewith and in which other position said spin tub is disconnected from said agitator, said electric motor being arranged to drive said agitator in a forward and reverse motion to give agitation to clothes placed within said spin tub in one mode of operation when said spin tub is disconnected from said agitator, and arranged to rotate said spin tub and said agitator continuously in one direction when the spin tub and the agitator are interconnected by said interconnecting means, at least one part of said spin tub and one part rotatable wit h said agitator being axially moveable relative to each other, each said one part having a part of said interconnecting means associated therewith, and interconnection actuating means are provided operable in a washing sequence to actuate said parts of said interconnecting means by relative axial movement of said at least one part rotatable with said agitator and said at least one part of said spin tub to connect said agitator to said spin tub when spin action is required and to actuate said parts of said interconnecting means to separate by opposite relative axial movement to permit said agitation of said agitator without material relative movement of said spin tub during a washing phase in said sequence.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples.

BRIEF DESCRIPTION OF THE DRAWINGS

One preferred form of the invention will now be described with reference to the accompanying drawings, in which.

DETAILED DESCRIPTION OF THE INVENTION

Figure 8:
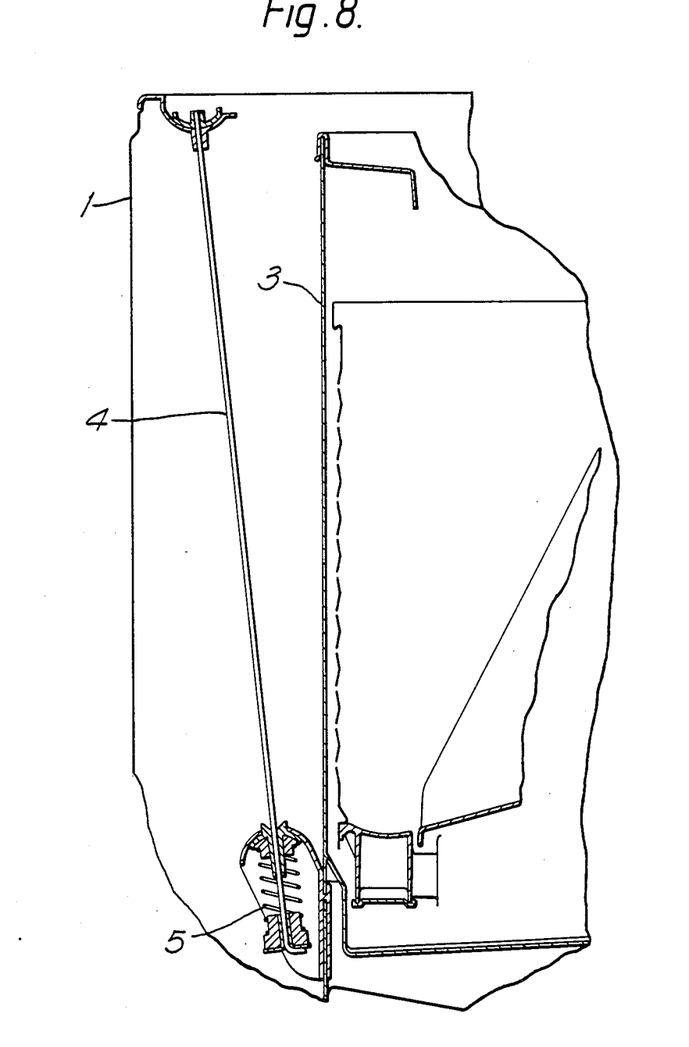
FIG. 8 is a partial elevation at 45° to the view of FIG. 1.

Referring to the drawings, a clothes washing machine comprises a cabinet 1 of square cross section which has mounted in it an electric motor 2 constructed according to the present invention as will be described further later. A water container 3 is suspended within the cabinet 1 by suspension rods 4 and springs 5, and for example four springs and rods are provided, and the motor and other mechanisms are attached to the container 3. The springs are provided in the corners of the square cross section cabinet 1; accordingly, parts of the rod are shown in sectional view in FIG. 8 which is at 45° to the other sectional view of FIG. 1. By "water" is meant washing liquid, e.g. water and detergent. Contained within the water container 3 there is a perforated spin tub 6 and within the spin tub is an agitator 7. An opening lid 9, shown only partially, is provided through which clothes may be inserted into the container and within the spin tub 6, and the spin tub is partly balanced by upper balancing ring 10 shown only in the rear at one side in FIG. 1. The springs terminate in hooks 12 which engage in apertures 13 in the container base molding 29 The agitator 7 is mounted on a hollow drive shaft 11 so as to rotate therewith but is slidable axially thereon. The spin tub 6 is coaxially mounted on the shaft 11 so as to be rotatable and also slidable axially thereon.

The motor 2 is constructed as follows. A rotor 15 has a backing ring 16 (FIG. 2) and the backing ring is formed from a strip of magnetic material, for example a silicon steel alloy and the strip of steel is coiled on edge with adjacent surfaces lightly insulated and touching each other to provide a short hollow cylinder or annular helix. Inside the helix there is provided a series of magnets 17, the backing ring 16 being expanded slightly before being placed over the magnets placed in a mold. The magnets are permanent magnets of a material capable of being magnetized to a high flux value, e.g. "Neodimium" iron made by Magnaquench Inc., and the annulus and the magnets are held in place by a plastic member 18 which has a hub 19, a disc or spoked connector portion 20, and a substantially cylindrical element 21, the member 18 being molded over the backing ring and magnets so as to maintain the inner faces of the magnets 17 concentric with the axis of the hub 19.

Figure 9:
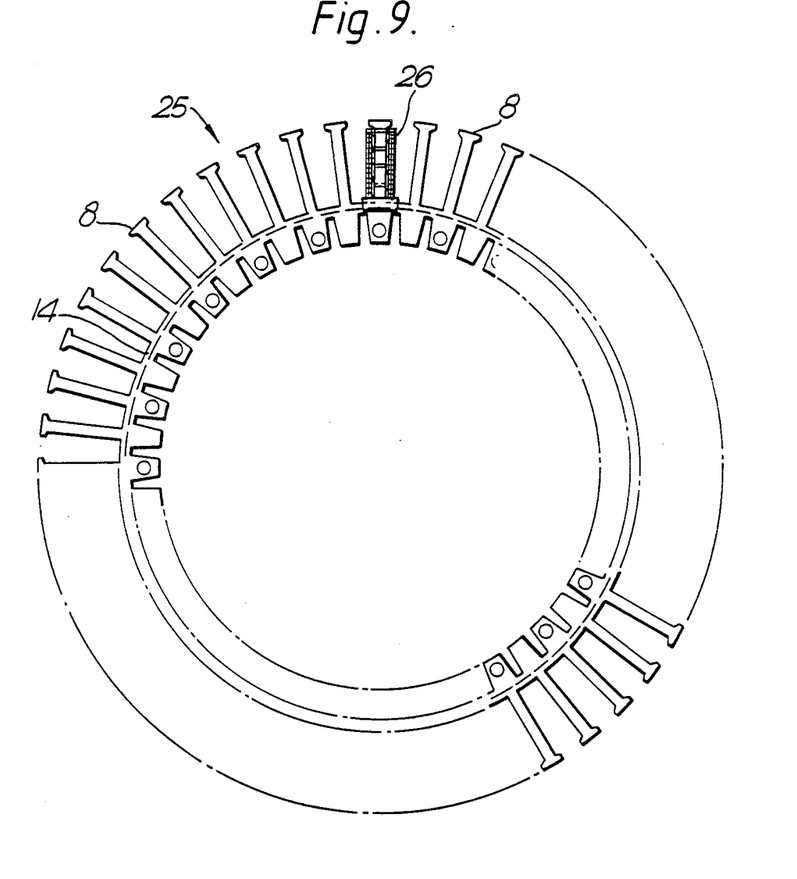
FIG. 9 is a rear view of a motor agitator forming part of the invention.

The stator 25 of the motor has a magnetic core which comprises a strip of magnetic material, again preferably a silicon steel alloy or other low hysteresis steel, which is preformed to provide spaced apart pole pieces, and again this strip is formed by bending on edge to form an annular helix in the form of a hollow cylinder with the poles 8 formed by the stacked pole pieces pointing outwardly. As may be seen in FIG. 9, the poles 8 are connected together by a narrow band 14 so that bending on edge is relatively easily effected. To provide insulation for windings on the poles of the core, a top insulating molding 22 is placed on one side of the poles and a bottom insulating molding 23 placed on the opposite side, meeting at a joint line 24. Windings are placed on the moldings wound around each pole and such windings 26 are effected on the poles directly.

It is preferable that the stator be wound in a three phase star connected mode and the windings are made and connected using known techniques.

The stator 25 and the rotor 15 are mounted as will shortly be described.

The water container 3 is preferably an injection molding, and the base 29 has motor support columns 30 preferably braced with stiffening webs 31. These webs extend to the outer perimeter of the container 3 and are molded integrally with the container.

Figure 3:
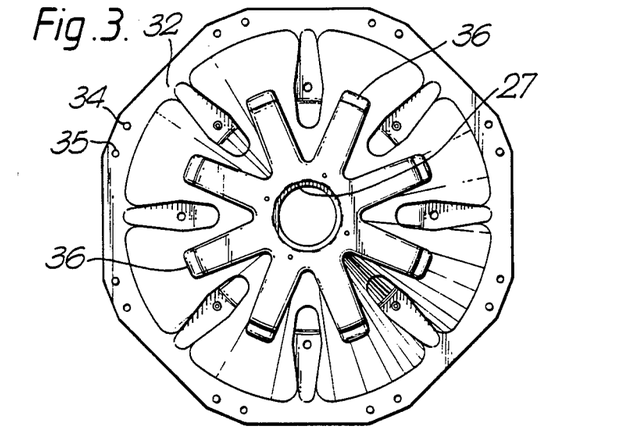
FIGS. 3 and 4 are respectively a plan view and cross section of preferred motor frames incorporated in the invention in the preferred form.
Figure 4:
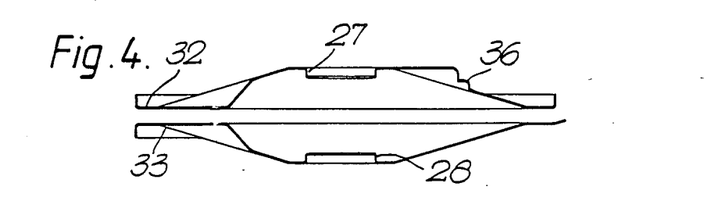

The motor 2 includes two bearing frames 32 and 33 which comprise injection moldings of a die case metal or plastic material or preferably steel pressings or plastic material. Preferably the frames 32 and 33 are produced from the same mold or set of dies, thus ensuring equality of dimensions between the two frames. The frames are carefully designed and made so that the bearing moldings 27 and 28 are concentric with locating pins or dimples 34 and corresponding holes 35 at the periphery of the frames and with the external angle 36 in which the inner corner 37 of the stator 25 fits with an interference fit.

Stiffening depressions 49 are provided to stiffen the frames, and on assembly one frame is assembled rotated 45° relative to the other frame to provide correct matching of holes and dimples.

Figure 2:
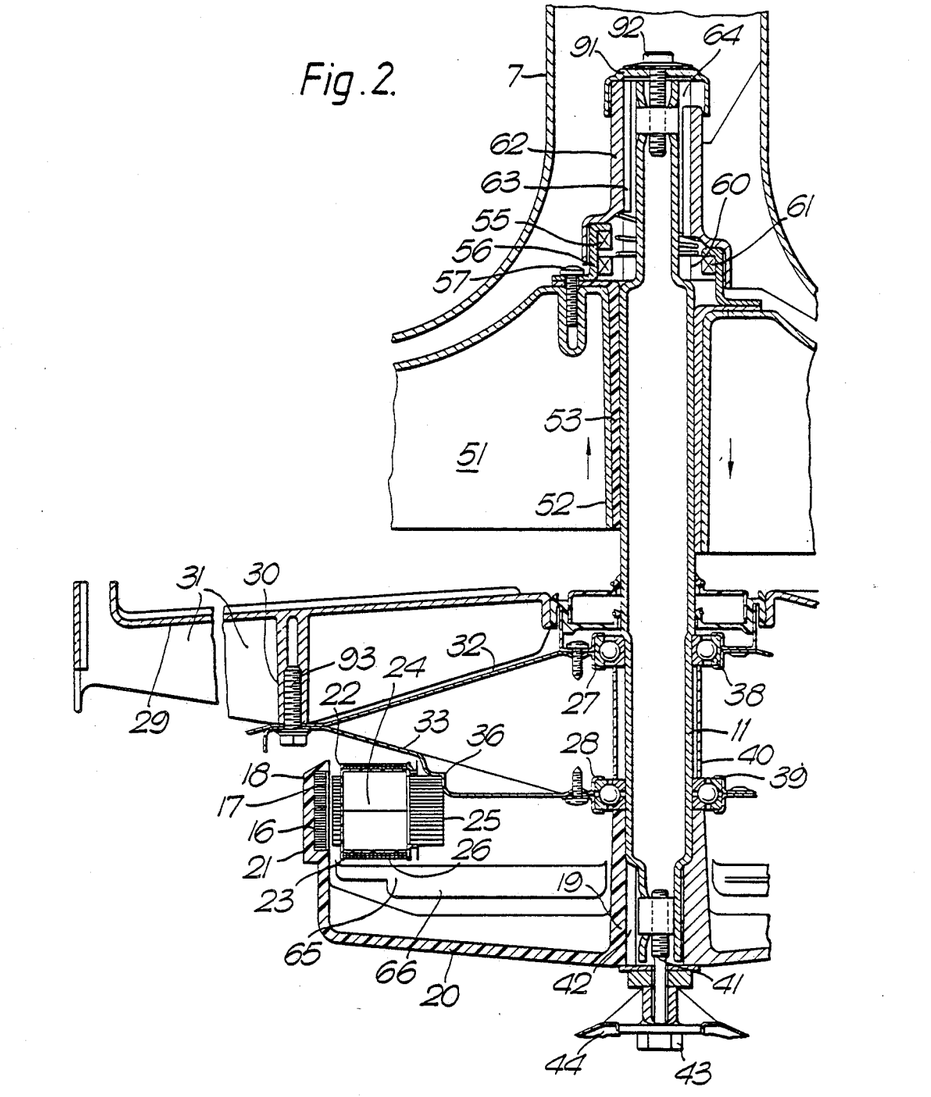
FIG. 2 is an enlarged view partly in cross section of a water container, spin tub, agitator, drive and electric motor.

Bearings 38 and 39 fit in the bearing mountings 27 and 28 and the bearings are spaced apart by a spacing tube 40 which encircles the drive shaft 11. The hub 19 is fixed to the shaft 11 by a bolt 41 engaging a nut 42 held in the hollow of the shaft 11 by the shaft 11 being swaged down to provide splines which engage corresponding sline spaces 42 in the hub 11. For transport purposes a further nut 43 holds the assembly supported by suspension rods and fixed to a cabinet member 44.

The spin tub 6 comprises a stainless steel perforated hollow cylinder 45 fixed to a plastic extruded base 46, e.g. by spinning the lower edge of the cylinder 45 on to the periphery of the plastic base 46. If desired, a lower balancing ring 47 is provided and the balancing rings are each comprised as a hollow ring with baffles and liquid container therein and the rings are each closed by an annular disc 48. One balancing ring, preferably the ring 10, was found to give reasonable balance while spinning.

A plurality of bridges 50 are provided at spaced intervals with gaps between them, and the bridges connect the balancing ring 47 (if fitted) to an air chamber in the form of a bell 51 having an open mouth directed downwardly and a tube 52 integral therewith which surrounds the shaft 11. A low friction plastic bearing 53 enables the plastic base 29 and consequently the spin tub 6 to rotate and slide axially on the drive shaft 11.

A series of downwardly directed dog clutch teeth 55 (FIG. 2) of a high impact duty material, e.g. a high impact duty plastic material, are carried by a carrier 56 riveted, screwed or otherwise fixed to the air chamber 51, e.g. by screws 57. A ring 60 carries coacting dog clutch teeth 61 also of a high impact duty material, and the ring 60 is rotatable by and axially slidable on the drive shaft 11, e.g. by engagement of splines on the ring 60 with splines on the drive shaft 11. The agitator 7 has a boss 62 with inner splines 63 engaging outer splines 64 on the ring 60 so that rotation of shaft 11 results in rotation of the teeth 61 and the agitator 7, and the boss 62 slides axially on the drive shaft 11 as may be seen by comparing the "up" position of elements on the left hand side of FIGS. 1 and 2 with the "down" position on the right hand side.

The air chamber 51 is designed to provide a flotation or buoyancy force resulting from the entrapment of air in the air tight chamber 51 when water closes the perimeter of the lower edge of the air chamber 51. In the event that water enters the air chamber 51, e.g. because of turbulence during agitation, the lower face could be closed off with the disc 54.

Figure 1:
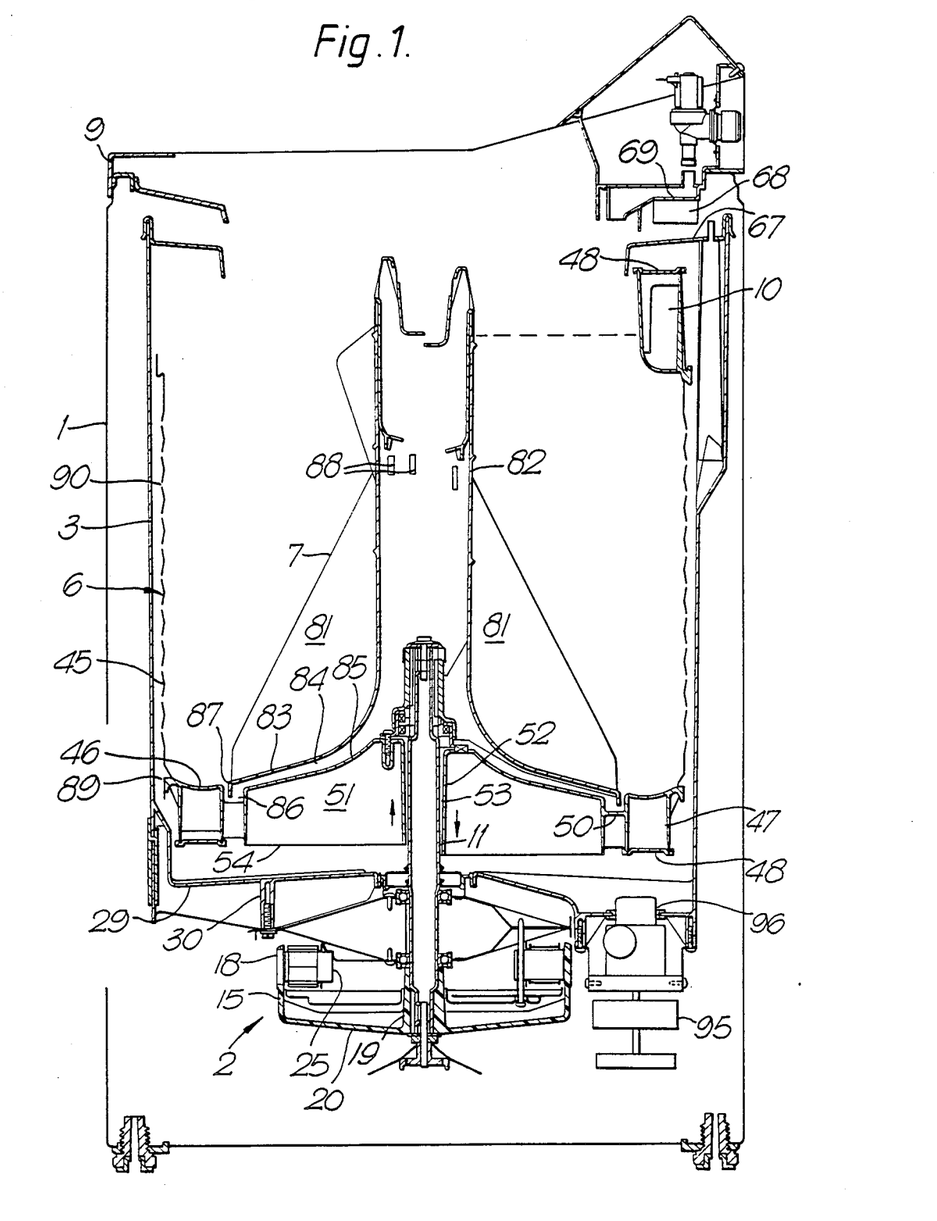
FIG. 1 is a cross sectional elevation of a clothes washing machine constructed according to the invention, with some parts shown at 45° plan to other parts.

The buoyancy force is at least sufficient to lift the spin tub 6 and the agitator 7 when a substantially predetermined volume of water is provided in the container 3, and the spin tub and agitator 7 are shown in the "up" position on the left hand side of FIGS. 1 and 2 and in the "down" position on the right hand side. When the spin tub 6 is in the up position, i.e. supported by flotation of the air chamber 51, the teeth 55 and the teeth 61 are disengaged from each other and the agitator may be rotated freely over any desired rotational movement independent of the spin tub 6. When water is absent or substantially absent from the container 3, the spin tub 6 sinks until the teeth 55 and 61 are engaged. The spin tub 6 and agitator will then be rotated as one unit and this rotation will be effected continuously in one direction to spin clothes in the spin tub to a drier condition in the known way. To assist in freeing frictional contact between the axially sliding parts during up and down movement of the spin tub during filling with, and emptying of water, control means are provided for controlling motor 2 to give a slow agitating action, i.e. forward and reverse rotation over a small arc of movement. At each reversal the dogs will reverse contact and be free of each other for a short time duo to clearances as between the dogs and spaces between the dogs.

To assist in fixing the spin tub against rotation during agitation, i.e. when the agitator is in the up position, the upper edge 67 of the spin tub may contact a frictional surface 68 on the underside of a top member 69 of the container 3.

The agitator 7 has external blades 81 thereon which extend from the surface of both column 82 and the upper surface of an upper coned disc 83. There is a space 84 between the disc 83 and the upper surface 85 of the air chamber 51; this space may be divided with radial vanes (not shown) since the purpose of the space arrangement is to provide a centrifugal impeller. Such an impeller may be otherwise provided, e.g. An independent centrifugal pump could be provided.

Outlet openings 86 are provided form the space 84 at or near the outer edge of the disc 83, the outer edge 87 of which is turned downwardly and operates in close proximity to the inner edge of the balance ring 46. As a result of this construction a pumping action is given, pumping water from the center of column 82 from apertures 88 through space 84 below balance ring 46 to space 86 between the spin tub 6 and the container 3, and lint is restrained in this space before the water re-enters the spin tub through the holes 90. If desired, a container may be mounted on the column 82, such container holding a clothes conditioner in the known way.

Electronic commutation equipment 65 is provided on an annular printed circuit board in an annular container 66 mounted below the stator 25, and the electronic commutation equipment is preferably enclosed in a compound for protection and heat sinking, and is such as to enable the electric motor 2 to move in a backward and forward motion thus causing the shaft 11 to be oscillated backward and forth resulting in the agitator 7 being also rotated in a back and forth motion to give the well known washing motion. Such electronic commutation equipment is described in copending New Zealand Application No. 213489/213490 and corresponding UK Patent Application No. 8622289 and U.S. patent application No. 06/908,176 which are incorporated herein by reference. The electronic commutation equipment 65 is also arranged to drive the motor continuously to give a spin action, and to drive the spin tub with the agitation when the absence of water from the container 3 results in engagement of teeth 55 and 61 as above described.

However, when the agitator is preferably given a slow agitation motion and the container 3 has water in it at least to a predetermined level, the flotation force of air in air chamber 51 causes the air chamber, spin tub and agitator to rise. The teeth 61 and the agitator may now move independently of the spin tub and thus may be oscillated back and forth at a desired rate and over any desired angle of rotation to give a washing action without material movement of the spin tub.

To provide seals between the drive shaft 11 and the base 29 of the water container, a short cylinder of, e.g. steel, 70 (FIG. 5) is fixed to the upper frame 32 by a screw 71, and a flange 27 holds the bearing 38 in place. The short cylinder 70 supports a seal 12 against the wall 23 of an aperture in the water container base 29, and a disc 74 holds a further seal 75 against the shaft 11, being reinforced by a backing ring 76. A played disc 77 holds a further seal 78 against the shaft 11 reinforced also by a spring 79, the flange 80 sitting within a short cylinder 81 integral with disc 77.

Figure 5:
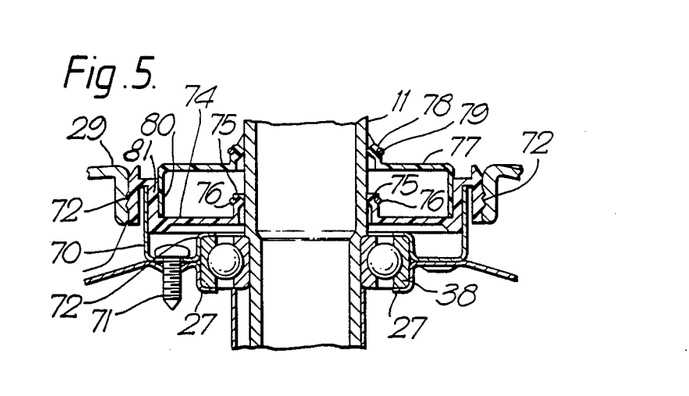
FIG. 5 is a further enlarged view of a seal shaft and bearings being part of FIG. 2.

The seal 72, short cylinder 81, disc 74 and seal 75 are integral with each other, and the played disc 77, seal 78 and flange 80 are integral with each other. Both units are made of "Neoprene" or other known flexible seal material.

A pump 95 is provided for the purpose of draining the container 3, and the pump 95 is mounted directly about an opening 96 in a lower part of the container 3 and thus a single flexible tube can run from the pump outlet through the back of the cabinet to the user drain connection point.

It is to be noted that the bearings 37 and 38 are a slip fit on the drive tube 11, and tightening of the bolt 41 and a cap 91 by a screw 92 clamps both bearings into position. Removal of the rotor securement screw 92 and the bolt 41 can result in the drive tube 11 being removed from above and the motor rotor 15 being removed from below. The motor 2 is removable as a unit after removing also the screws 93 holding the frames 32 and 33 in position. Thus for maintenance this removal can be readily effected. Furthermore, following removal of the securement screw 92, the agitator and agitator hub can be removed and the spin tub assembly then lifted off from above. Thus maintenance is very simple.

It is also to be noted that because the spin tub and its contents float during the agitation phase, no thrust bearing is required. Also, the bearing 53 operates under water and only under low speed conditions, i.e. the agitator speed relative to the substantially stationary spin tub, and therefore the bearing need only be a light duty bearing.

Figure 6:
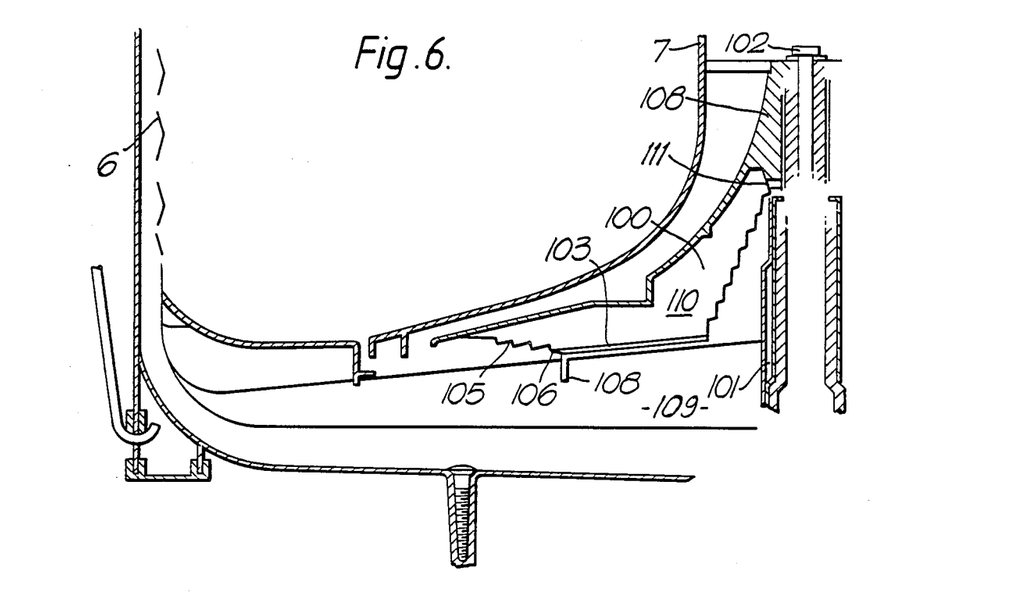
FIG. 6 is a partial cross section of an alternative embodiment of the invention.

An alternative form of interconnection means is provided as follows:

The agitator 7 has associated with it a bell 100, both being fixed to the shaft 101 by a bolt 102. The shaft 101 corresponds to the shaft 11 and is driven by an electric motor as above described.

Within the bell 100 is a rise and fall member 103 which is a plastic molding sealably attached by flexible bellows 105, e.g. of "Neoprene", to the outer edge 106 of the plastic member 103 and to the edge of the bell 100. A further flexible bellows is sealably attached to the member 103 and to the hub of the bell 100. The member 103 has prongs or dogs 108 spaced at intervals thereon, and such prongs or dogs 108 engage in the spaces between castellations 109 in the bottom of the spin tub 6. A spring (not shown) is provided which exerts a downward force from the hub 108 on the member 103, and the cavity 110 is open to the atmosphere through a cross hole or notch 111 in the hub 104 and a series of holes in the shaft or drive tube 101. This arrangement is such that when the container 3 is emptying, the spring moves the member 103 downwardly so that the prongs or dogs 108 engage in the spaces between the castellations and thus the spin tub will move with the agitator and be rotated with that agitator continuously for the purpose of spinning. However, when the container 3 has water in it to a predetermined level, the hydrostatic water pressure on the undersurface of the member 103 causes that member to rise against the pressure of the spring, air venting through the air holes above-mentioned, and the prongs or dogs 108 are then raised out of contact with the spin tub and the agitator may now move independently of the spin tub and thus may be oscillated back and forth to give washing action.

Figure 7:
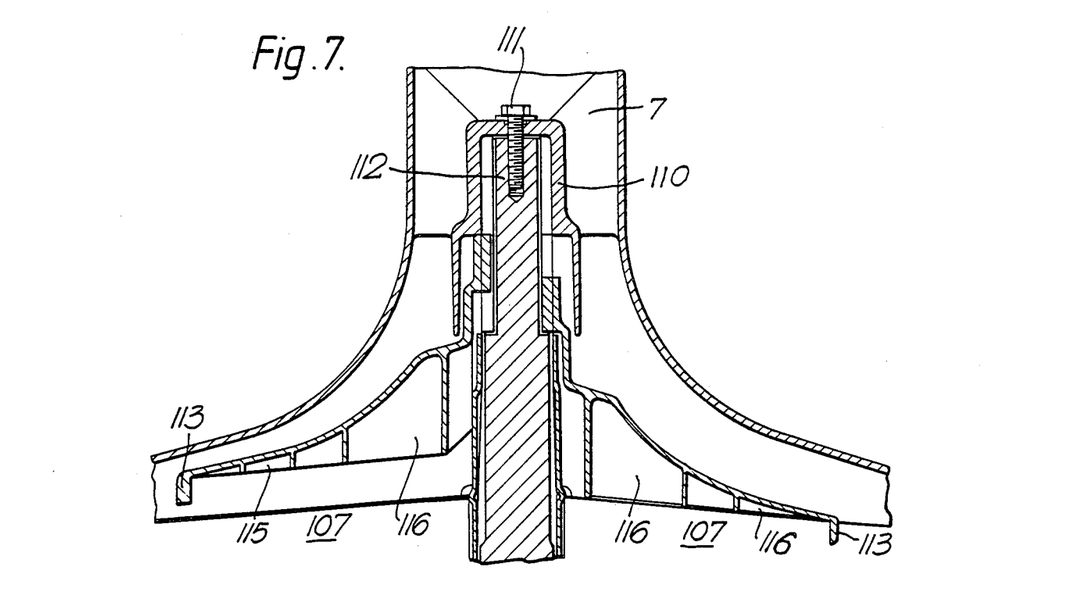
FIG. 7 is a partial cross section of a further alternative embodiment of the invention.

In a further alternative arrangement of the spin tub to agitator interconnecting means shown in FIG. 7, the agitator 7 is combined with a hub 110 fixed by a bolt 111 to a solid splined shaft 112. An air chamber in the form of a bell member 115 is a slidable fit on the shaft 112 and has air entrapment spaces 116 in which air is trapped by rising water in the container 3 when the latter is being filled preparatory to agitation occurring. The bell 115 then acts as a float, raising detents or dogs 113 from engagement with castellations 107, as shown on the right hand side of FIG. 7, to a disengaged position as shown on the left hand side of FIG. 7.

A least in the preferred forms, the invention provides the following advantages:

1. The electric motor assembly and construction is integrated with the drive system in that a simple shaft and pair of bearing supports the rotor at one end of the agitator and spin tub at the other end, avoiding the need for separate shafts and bearings for the motor and for the agitator and spin tub drive.

2. The mounting of the stator and the rotor outboard of the lower motor frame enable ready replacement of the stator and/or rotor.

3. The mounting of the electronics in an annular disk associated with the stator of the motor reduces the length of interconnecting wiring and enables a compact factory wired unit to be provided.

4. The floating spin tub concept eliminates the need for springs and bearings and enables ready maintenance to be carried out.

5. The complete freedom of the agitator to rotate through an unlimited angle of rotation during agitation enables any desired angle of rotation.

What is claimed is:

1. A drive for a clothes washing machine of the type having a cabinet in which an agitator is mounted on a vertical shaft so as to rotate therewith and to be oscillated back and forth within a coaxially mounted perforated spin tub, the spin tube and the agitator being rotatable continuously in one direction for providing a spin action, and the perforated water tight container, said cabinet containing a salient pole electric motor and driving means for selectively oscillating said agitator back and forth or rotating said spin tub continuously in one direction, said electric motor having a stator carrying energizable windings on salient pole pieces stationary water tight container and supporting said stator, said shaft carrying said rotor at one end thereof and said agitator at another end thereof, said shaft being mounted on a motor rotor and said agitator.

* * * * *

UNITED STATES PATENT AND TRADEMARK OFFICE
CERTIFICATE OF CORRECTION

PATENT NO. : 4,853,571
DATED      : August 1, 1989
INVENTOR(S) : Smith

It is certified that error appears in the above-identified patent and that said Letters Patent is hereby corrected as shown below:

Please amend claim 1 as follows:

Line 9, replace "tube" with --tub--;

Line 11, after "perforated", insert --spin tub and agitator in turn being mounted with a stationary--;

Line 16, after "pieces", insert --thereof, a rotor, and stator support frame mounted on said--; and Line 20, after "a", insert --single pair of bearings spaced intermediately of said electric--.

Signed and Sealed this

Second Day of October, 1990

*Attest:*

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,853,571
DATED : August 1, 1989
INVENTOR(S) : SMITH

It is certified that error appears in the above-identified patent and that said Letters Patent is hereby corrected as shown below:

Please amend claim 1 as follows:

Column 10

Line 9, replace "tube" with --tub--;

Line 11, after "perforated", insert --spin tub and agitator in turn being mounted within a stationary--;

Line 16, after "pieces", insert --thereof, a rotor and a stator support frame mounted on said--; and Line 19, after "a", insert --single pair of bearings spaced intermediately of said electric--.

This certificate supersedes Certificate of Correction issued October 2, 1990.

Signed and Sealed this

Twenty-eighth Day of July, 1992

Attest:

DOUGLAS B. COMER

*Attesting Officer*      *Acting Commissioner of Patents and Trademarks*